Dec. 12, 1967   J. L. GROSH ETAL   3,357,594
CLEVIS JOINT
Filed Feb. 21, 1962
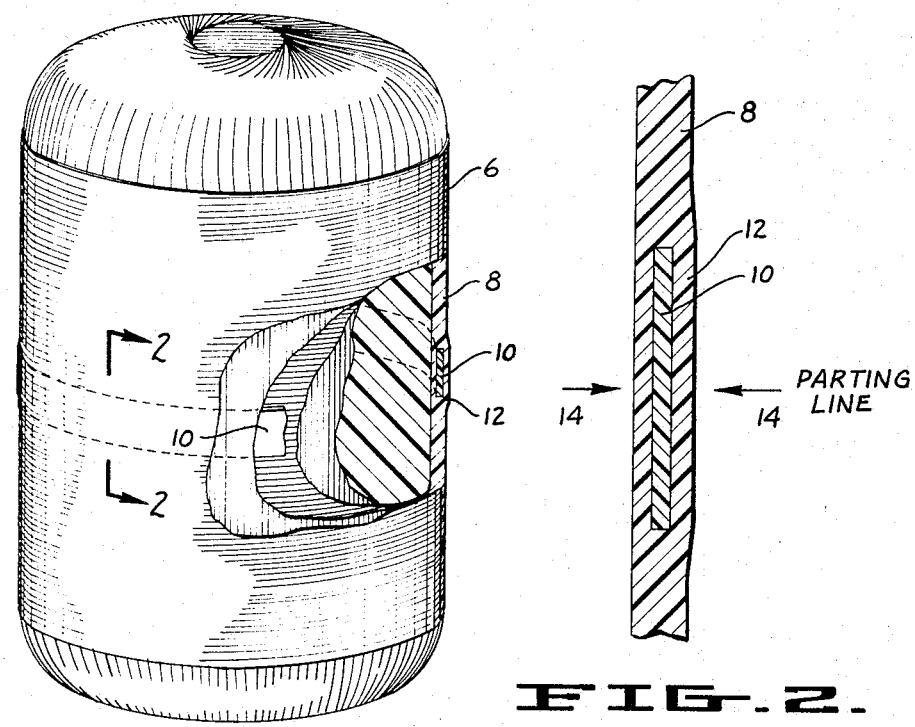
FIG. 1.
FIG. 2.
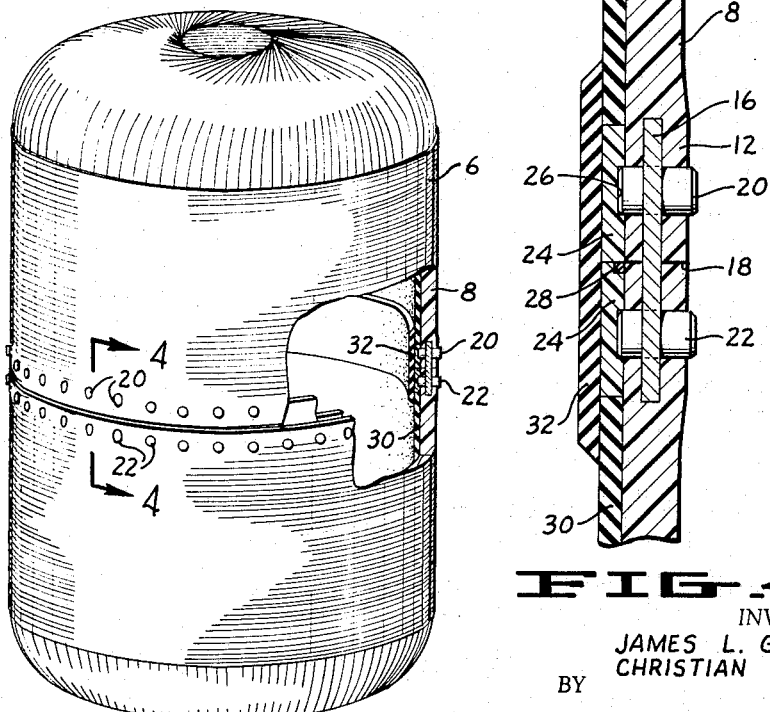
FIG. 3.
FIG. 4.
INVENTORS
JAMES L. GROSH
CHRISTIAN M. FREY
BY
*Eckhoff & Slick*
ATTORNEYS

United States Patent Office 3,357,594
Patented Dec. 12, 1967

3,357,594
CLEVIS JOINT
James L. Grosh and Christian M. Frey, Los Altos, Calif., assignors to United Aircraft Corporation, a corporation of Delaware
Filed Feb. 21, 1962, Ser. No. 174,844
8 Claims. (Cl. 220—80)

This invention relates to a structure and a method for providing joints in filament wound reinforced plastic pressure vessels. Filament wound glass fiber reinforced plastic pressure vessels are used for a variety of purposes such as rocket motors, space vehicles, chemical reaction vessels and the like but at the present time the utility of large diameter filament-wound reinforced plastic pressure vessels is somewhat limited because of the inability to produce joints in such vessels capable of operating at internal pressures exceeding about 100 p.s.i. Satisfactory joints have been evolved for small vessels but joints for larger vessels, i.e. larger than 21 inches in diameter, have been incapable of resisting high pressures.

In accordance with the present invention, a simple joint is provided which is capable of resisting high pressures. Further, the joint is simple to make and normally does not involve any complicated machining operations.

It is therefore an object of the present invention to provide an effective clevis joint for filament wound reinforced plastic pressure vessels which joint is simple to construct, does not utilize complicated machining techniques or parts and which is simple to assemble.

Other objects will be apparent from the specification which follows.

In the drawings forming a part of this application:

FIGURE 1 is a perspective view, partially in section of a filament wound reinforced plastic vessel having an insert ring therein illustrating one method of fabricating the joint of the present invention.

FIGURE 2 is a sectional view on the lines 2—2 of FIGURE 1.

FIGURE 3 is a perspective view, partially in section of a pressure vessel having a joint embodying the present invention.

FIGURE 4 is a sectional view on lines 4—4 of FIGURE 3.

Referring now to the drawings by reference characters, FIGURES 1 and 2 illustrate preliminary stages in one method of fabricating the joint of the present invention. Here a glass fiber reinforced plastic vessel 6 having a side wall 8 of substantially uniform cross section has been fabricated by the spiral winding of glass fibers coated with an epoxy resin over a removable mandrel. Such fabrication methods are well known to those skilled in the art. In this embodiment of the invention, a removable annular member 10 has been formed in place near the center of the wall and the wall itself has been thickened as at 12 to provide extra strength for the joint. The thus fabricated vessel is then sliced, cut or otherwise parted on the line 14 and the member 10 removed. Member 10 may be made of a material such as rubber which does not adhere to the glass fibers and after the vessel has been parted, the embedded portions of the member 10 may be pulled out leaving the two halves of the vessel, each of which has an annular U-shaped slot where the portion of the member 10 was removed. Other methods of construction can be employed such as the employment of a meltable or soluble member 10 which is melted or dissolved out of the wall after the parting cut has been made. Further, the device can be made without the use of the filler member 10 by providing a vessel with a thickened wall, and then milling slots in the abutting ends after the parting cut has been made.

To assemble the halves into the completed structure, member 16 is provided of a suitable material and of substantially the same thickness as the slot. The member 16 is preferably of metal although reinforced plastic may be used. The member 16 can be in the form of a continuous hoop or can be in the form of a series of discrete plates. If plates are employed, they may be wide enough for a single pair of rivet holes or two or more pairs of holes may pass through the same plates.

After inserting the reinforcing member or members 16, which hold the two halves in place, holes may be drilled or otherwise formed through the thickened portion 12 and through the member 16. These holes are drilled at substantially equal distances from the point of junction 18 of the two halves and sufficiently far back from the parting line as to provide a substantial thickness of material between the holes and the parting line. Suitable pins 20 and 22 are then passed through the drilled holes so that the member 16 is gripped by the pins forming a strong joint. The pins may be either cylindrical or tapered and may be provided with means for holding them in place. The holes may be threaded and bolts used instead of rivets. Ordinarily, the pins are made slightly oversized and forced into place so that they are held in place by friction.

If the method of construction is used in the formation of a rocket engine casing, some means must be employed on the side of the vessel to keep the joint relatively cool. In the embodiment shown in FIGURES 3 and 4 this is achieved by providing glass fiber rings 24 within the vessel which may be slightly recessed as at 26 to receive the ends of the pins. O-rings can be provided to make a gas tight seal. Insulation, as is common in the rocket engine art can be applied to the walls of a vessel as at 30 and over the joint as at 32.

The thickening of the joint shown at 12 is made by the use of metal foil or wire or ceramic filaments which are wound into the vessel or glass fabrics can be incorporated in the vessel as it is wound to provide additional strength.

Although the vessel has been described as being composed of two halves, it is obvious that several such joints might be used in a single structure. For instance, a central cylindrical section might be joined to two hemispherical end sections by this method.

It is believed apparent from the foregoing that we have provided a method of joining sections of a filament wound reinforced plastic pressure vessel which method is simple and effective.

We claim:

1. A joint structure for a filament wound reinforced plastic pressure vessel comprising a joint having two abutting ends, an annular slot in the end walls of each of said abutting ends, a solid member extending into each of said slots and radial pins extending through the walls of the vessel on each side of the joint and through the solid member forming a clevis.

2. The structure of claim 1 wherein the solid member is a single hoop.

3. The structure of claim 1 wherein the solid member comprises a series of plates disposed circumferentially within the slots.

4. The structure of claim 1 wherein the solid member is metal.

5. The structure of claim 1 wherein the filament wound plastic walls are thickened at the slot.

6. The structure of claim 1 wherein the pins are tapered.

7. In combination with a filament wound reinforced plastic pressure vessel comprising at least two segments each defined by a wall, the end of said wall of one segment abutting the end of said wall of another segment, an improved joint structure comprising
(a) a thickened portion in said walls extending longitudinally from said ends for a predetermined distance
(b) aligned annular slots in each of said abutting ends said slots extending longitudinally for a distance no greater than said predetermined distance
(c) solid longitudinal load bearing means in said aligned slots and substantially coextensive with the combined longitudinal length thereof and
(d) radial pins extending through said thickened portions of said walls on each side of said abutting ends and through said load bearing means whereby a clevis is formed.

8. The combination of claim 7 wherein said longitudinal load bearing means comprises a plurality of discreet tabs uniformly distributed in said slots.

References Cited

UNITED STATES PATENTS

| | | | |
|---|---|---|---|
| Re. 9,737 | 5/1881 | Whittemore | 285—331 X |
| 1,446,274 | 2/1923 | Roberts | 220—80 |
| 2,120,881 | 6/1938 | Assbroicher et al. | 29—416 |
| 2,556,033 | 6/1951 | Flumerfelt | 29—416 |
| 2,751,109 | 6/1956 | Moore | 220—80 |
| 2,770,386 | 11/1956 | Mitchell et al. | 220—76 X |
| 3,024,941 | 3/1962 | Vandenberg | 220—63 |
| 3,039,649 | 6/1962 | Aleck | 220—80 |
| 3,101,208 | 8/1963 | Clifford et al. | 220—80 X |
| 3,133,753 | 5/1964 | Goodman et al. | 285—331 X |

FOREIGN PATENTS

| | | |
|---|---|---|
| 19,232 | 8/1909 | Great Britain. |
| 591,217 | 4/1959 | Italy. |

THERON E. CONDON, *Primary Examiner.*

J. R. GARRETT, *Assistant Examiner.*